US008375122B2

(12) United States Patent
Sheng et al.

(10) Patent No.: US 8,375,122 B2
(45) Date of Patent: Feb. 12, 2013

(54) WEB SERVICE INFORMATION MANAGEMENT IN SERVICE-ORIENTED ARCHITECTURE APPLICATIONS

(75) Inventors: Mao Xin Sheng, Beijing (CN); Li Yi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1905 days.

(21) Appl. No.: 11/535,086

(22) Filed: Sep. 26, 2006

(65) Prior Publication Data

US 2007/0143474 A1 Jun. 21, 2007

(30) Foreign Application Priority Data

Dec. 15, 2005 (CN) .......................... 2005 1 0105720

(51) Int. Cl.
*G06F 15/173* (2006.01)
*G06F 15/16* (2006.01)
*G06F 15/177* (2006.01)
*G06F 3/00* (2006.01)

(52) U.S. Cl. ........ 709/224; 709/203; 709/217; 709/218; 709/219; 709/220; 709/221; 709/227; 709/228; 709/229; 709/230; 709/238; 709/239; 709/240; 709/242; 709/243; 709/244; 709/245; 709/246; 709/247; 719/315; 719/330; 719/331; 370/352; 370/401; 705/7; 705/26

(58) Field of Classification Search .................. 709/217, 709/227, 240, 315, 203, 218, 219, 220, 221, 709/224, 228, 229, 230, 238, 239, 242, 243, 709/244, 245, 246, 247; 719/330–331, 315; 370/352, 401; 705/7, 26
See application file for complete search history.

(56) References Cited

U.S. PATENT DOCUMENTS

| 6,798,789 | B1 * | 9/2004 | Jackson et al. ............... 370/489 |
| 7,072,807 | B2 * | 7/2006 | Brown et al. ...................... 703/1 |
| 7,127,460 | B2 * | 10/2006 | Nixon et al. .......................... 1/1 |
| 7,188,155 | B2 * | 3/2007 | Flurry et al. .................. 709/219 |
| 7,404,188 | B2 * | 7/2008 | Luty et al. ..................... 719/315 |
| 7,444,620 | B2 * | 10/2008 | Marvin ......................... 717/116 |
| 7,460,531 | B2 * | 12/2008 | Gupta et al. .................. 370/389 |
| 7,483,438 | B2 * | 1/2009 | Serghi et al. ................. 370/401 |
| 7,502,797 | B2 * | 3/2009 | Schran et al. ........................ 1/1 |

(Continued)

FOREIGN PATENT DOCUMENTS

JP 5141391 A 6/1993

*Primary Examiner* — John Follansbee
*Assistant Examiner* — Saket K Daftuar
(74) *Attorney, Agent, or Firm* — Steven L. Nichols; Van Cott, Bagley, Cornwall & McCarthy P.C.

(57) ABSTRACT

Web server information management in a service-oriented architecture application comprises intercepting a service request message issued by a Web service requester for a Web service in response to executing the service-oriented architecture application on the Web service requester side, adding a tracing header in the service request message for requesting the detailed runtime information of the Web service and sending the message to the Web service provider side, intercepting the service request message coming from the Web service requester on the Web service provider side, tracing detailed runtime information based on the tracing header for requesting the detailed runtime information in the message during the execution of the Web service with respect of the service request message, and adding an acknowledgement tracing header containing the traced detailed runtime information into the response message to be returned to the Web service requester by the Web service provider and returning the message to the Web service requester.

20 Claims, 7 Drawing Sheets

U.S. PATENT DOCUMENTS

| | | | |
|---|---|---|---|
| 7,546,602 B2 * | 6/2009 | Hejlsberg et al. | 719/313 |
| 7,624,404 B2 * | 11/2009 | Yagi | 719/330 |
| 7,630,965 B1 * | 12/2009 | Erickson et al. | 1/1 |
| 7,653,008 B2 * | 1/2010 | Patrick et al. | 370/254 |
| 7,698,398 B1 * | 4/2010 | Lai | 709/223 |
| 7,711,836 B2 * | 5/2010 | Videlov et al. | 709/230 |
| 7,716,279 B2 * | 5/2010 | Savchenko et al. | 709/203 |
| 7,716,360 B2 * | 5/2010 | Angelov | 709/231 |
| 7,730,447 B2 * | 6/2010 | Ringseth et al. | 717/106 |
| 7,761,533 B2 * | 7/2010 | Angelov | 709/217 |
| 7,779,388 B2 * | 8/2010 | Ringseth et al. | 717/117 |
| 7,788,338 B2 * | 8/2010 | Savchenko et al. | 709/218 |
| 2002/0006133 A1 * | 1/2002 | Kakemizu et al. | 370/401 |
| 2002/0147645 A1 * | 10/2002 | Alao et al. | 705/14 |
| 2003/0095540 A1 * | 5/2003 | Mulligan et al. | 370/352 |
| 2003/0171113 A1 * | 9/2003 | Choi | 455/420 |
| 2003/0204645 A1 * | 10/2003 | Sharma et al. | 709/328 |
| 2004/0039964 A1 | 2/2004 | Russell et al. | |
| 2004/0064503 A1 * | 4/2004 | Karakashian et al. | 709/203 |
| 2004/0093381 A1 | 5/2004 | Hodges et al. | |
| 2004/0139151 A1 * | 7/2004 | Flurry et al. | 709/203 |
| 2004/0167960 A1 * | 8/2004 | Kinner et al. | 709/203 |
| 2004/0205765 A1 * | 10/2004 | Beringer et al. | 719/311 |
| 2004/0225952 A1 * | 11/2004 | Brown et al. | 714/819 |
| 2005/0021689 A1 * | 1/2005 | Marvin et al. | 709/220 |
| 2005/0038708 A1 * | 2/2005 | Wu | 705/26 |
| 2005/0044197 A1 * | 2/2005 | Lai | 709/223 |
| 2005/0050228 A1 * | 3/2005 | Perham et al. | 709/246 |
| 2005/0066317 A1 * | 3/2005 | Alda et al. | 717/136 |
| 2005/0080873 A1 * | 4/2005 | Joseph | 709/217 |
| 2005/0086255 A1 * | 4/2005 | Schran et al. | 707/102 |
| 2005/0089033 A1 * | 4/2005 | Gupta et al. | 370/389 |
| 2005/0091192 A1 * | 4/2005 | Probert et al. | 707/1 |
| 2005/0125555 A1 | 6/2005 | Patel | |
| 2005/0138634 A1 * | 6/2005 | Luty et al. | 719/315 |
| 2005/0154785 A1 * | 7/2005 | Reed et al. | 709/217 |
| 2005/0160434 A1 * | 7/2005 | Tan et al. | 719/331 |
| 2005/0234969 A1 * | 10/2005 | Mamou et al. | 707/102 |
| 2005/0251853 A1 * | 11/2005 | Bhargavan et al. | 726/1 |
| 2005/0262188 A1 * | 11/2005 | Mamou et al. | 709/203 |
| 2005/0262191 A1 * | 11/2005 | Mamou et al. | 709/203 |
| 2005/0262193 A1 * | 11/2005 | Mamou et al. | 709/203 |
| 2005/0262194 A1 * | 11/2005 | Mamou et al. | 709/203 |
| 2005/0278348 A1 * | 12/2005 | Falter et al. | 707/100 |
| 2006/0026094 A1 | 2/2006 | Oral et al. | |
| 2006/0031234 A1 * | 2/2006 | Beartusk et al. | 707/100 |
| 2006/0080352 A1 * | 4/2006 | Boubez et al. | 707/102 |
| 2006/0112367 A1 * | 5/2006 | Harris | 717/100 |
| 2006/0168355 A1 * | 7/2006 | Shenfield et al. | 709/250 |
| 2006/0212574 A1 * | 9/2006 | Maes | 709/226 |
| 2006/0212593 A1 * | 9/2006 | Patrick et al. | 709/230 |
| 2006/0235733 A1 * | 10/2006 | Marks | 705/7 |
| 2007/0067473 A1 * | 3/2007 | Baikov et al. | 709/230 |
| 2007/0067494 A1 * | 3/2007 | Savchenko et al. | 709/246 |
| 2007/0073771 A1 * | 3/2007 | Baikov et al. | 707/104.1 |
| 2008/0313282 A1 * | 12/2008 | Warila et al. | 709/206 |

\* cited by examiner

WEB SERVICE INFORMATION MANAGEMENT IN SERVICE-ORIENTED ARCHITECTURE APPLICATIONS

BACKGROUND OF THE INVENTION

The present invention relates to the development of service-oriented architecture applications, and, in particular, to Web service information management in service-oriented architecture applications.

SOA is a concept defining that an application can be composed of a series of independent, but collaborative subsystems or services. Such an architecture makes each service independent as long as telling other services the interfaces that need to be declared SOA makes various services available in a network through adopting those widely accepted standards (such as WSDL, XML, XSD, UDDI, and HTTP), and allows an application to find and bind active services (through UDDI and WSDL) for creating loosely coupled enterprise business processes. Thus, in SOA, a web service application may be composed of remote Web services in different domains, so that a service process across multiple business ranges can be used in place of a traditional layered application.

In SOA, a SOA application should meet the Service Level Agreement (SLA) to ensure the reliability and practicability of the service purchased by an enterprise so as to meet the quality requirements of the enterprise. In such a case, application developers and administrators need to know the detailed runtime information on the interaction between the SOA application service process and service participants, so it is necessary to acquire the runtime information of these web services. Thus, it can be seen that the runtime information on the interaction with the web services in a SOA application service process is very important for both the application development and Web service management.

Figure 1:
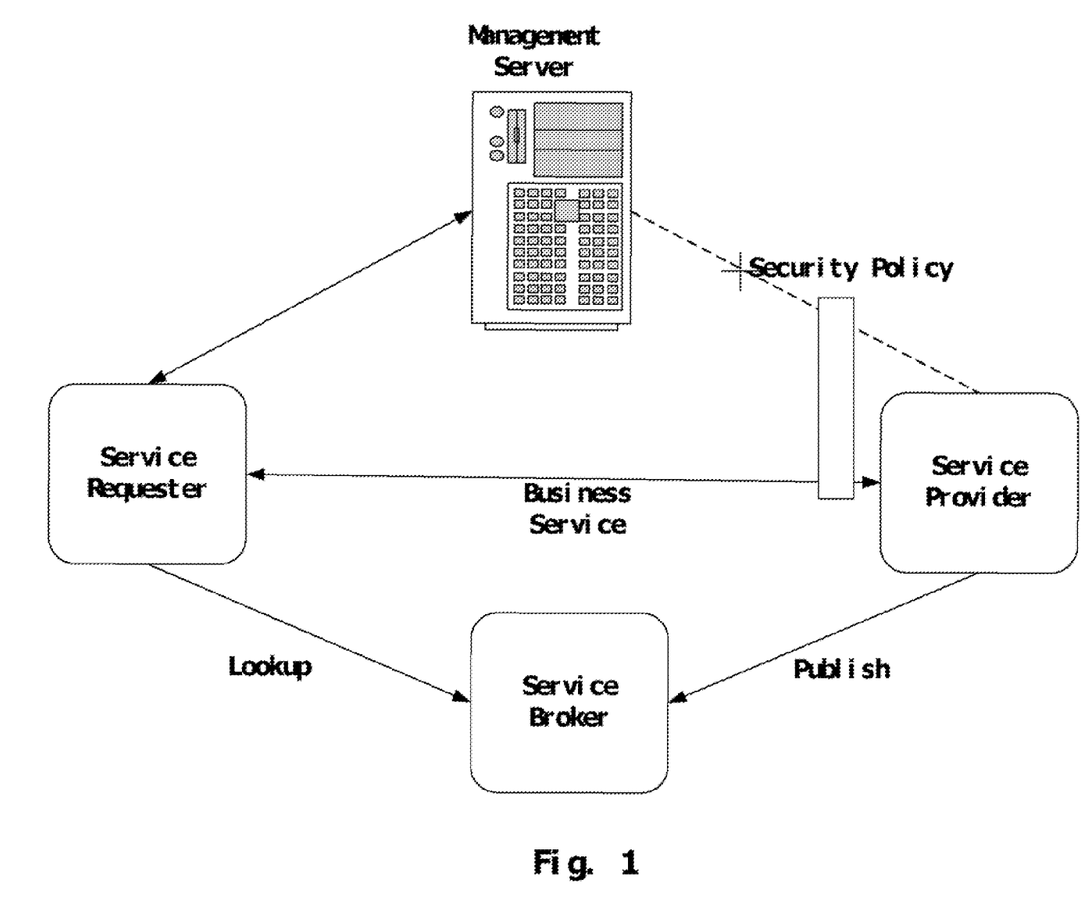
FIG. 1 shows the traditional Web service information management model.

FIG. 1 shows a traditional Web service information management model. In the traditional management model shown in FIG. 1, there is provided a management server that communicates directly with managed resources to acquire service information. As shown in FIG. 1, however, in a SOA application, a service requester usually uses a service broker or other mediators to access a service provider. Location transparency (a service requester can request a web service without knowing the location of the Web service) and the dynamic nature of the Web service interaction introduce great complexity into identifying the real location of the managed resources. Besides, as shown in FIG. 1, due to the above-mentioned distributed and loosely coupled features of a SOA application, services across geography, department and/or company boundaries may be involved in the SOA application service process. In such a case, because of the security policies in the various management domains, it is very difficult to communicate directly with services in these different management domains to collect their management information. Obviously, traditional management model is not suitable for a service-oriented architecture.

Figure 2:
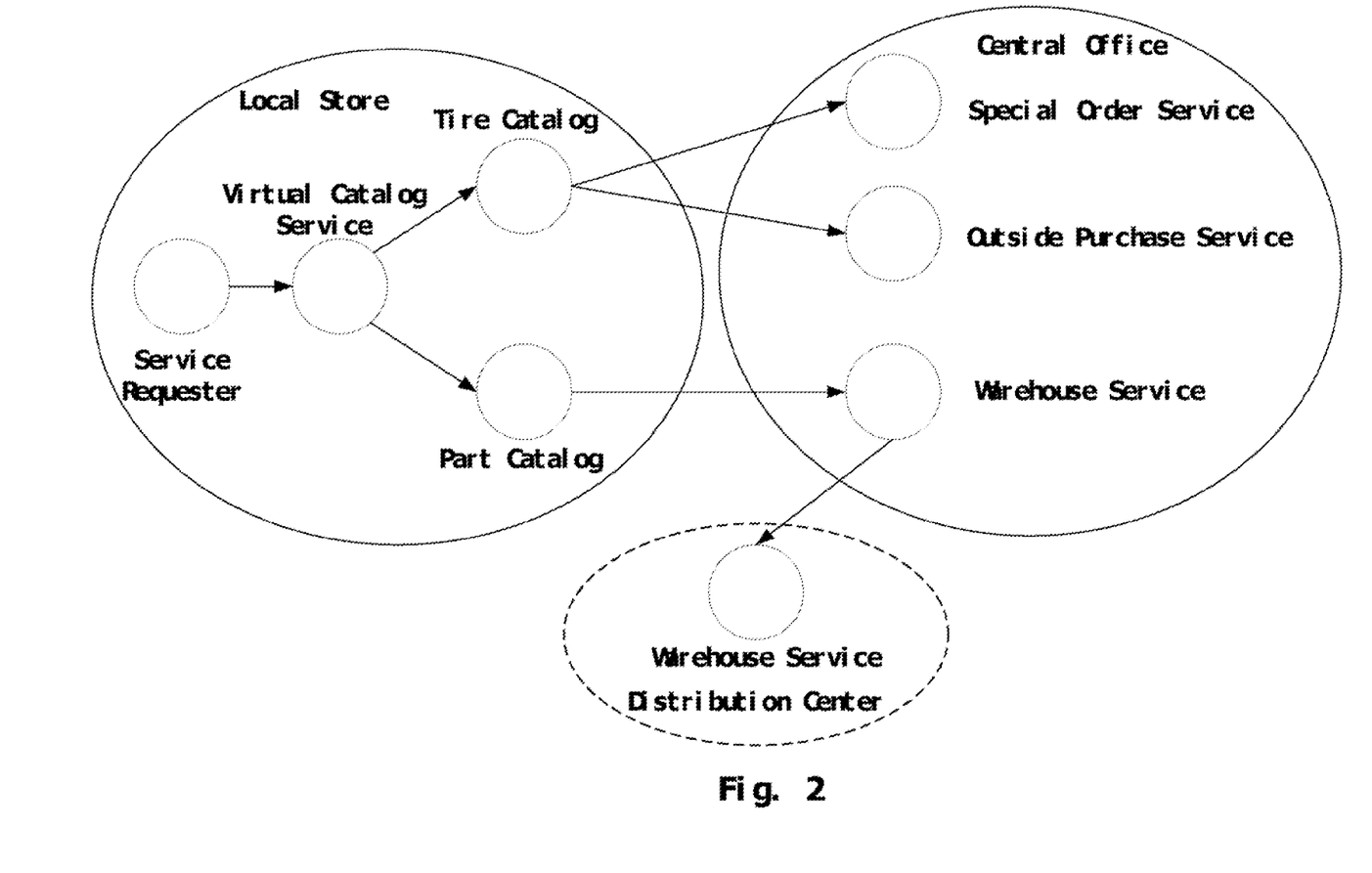
FIG. 2 shows the service process of a specific example of service-oriented architecture applications.

In an another aspect, in a service-oriented architecture, the execution process of a Web service may include a series of Web service invocations. Collecting the runtime information during the execution process of a Web service is very important for system management and maintenance. Next, a specific SOA application example will be used to explain the issue of information collection in a Web service execution process. FIG. 2 shows the service process of the application example. As shown in FIG. 2, a virtual catalog service in a store provides goods lookup service. When a service requester requests the service, the service will invoke physical catalog services deployed in the local store and central office according to the business logic and QoS requirements, wherein part of the services provided by the central office is provided by business partners. In the case of out of stock in the local store, the store would invoke the warehouse service of the central office. And the central office would invoke the service of the nearest distribution center which will return the stock situation. The services involved in this Web service process are determined in runtime and may be distributed in different management domains or physical locations.

BRIEF SUMMARY OF THE INVENTION

According to one aspect of the present invention, a method for Web service information management in a service-oriented architecture application comprises intercepting a service request message issued by a Web service requester for a Web service in response to executing the service-oriented architecture application on the Web service requester side, adding a tracing header in the service request message for requesting the detailed runtime information of the Web service and sending the message to the Web service provider side, intercepting the service request message coming from the Web service requester on the Web service provider side, tracing detailed runtime information based on the tracing header for requesting the detailed runtime information in the message during the execution of the Web service with respect of the service request message, and adding an acknowledgement tracing header containing the traced detailed runtime information into the response message to be returned to the Web service requester by the Web service provider and returning the message to the Web service requester.

According to another aspect of the present invention, a message interceptor on the Web service requester side comprises a message intercepting module for intercepting the messages communicated between the Web service requester and the Web service provider during a service-oriented architecture application is executed, a message analysis module for analyzing messages intercepted by the message intercepting module to identify the service request messages issued by the Web service requester and the response messages containing tracing headers provided by the Web service provider, a tracing header adding module for adding a tracing header in a service request message sent by the Web service requester for requesting the detailed runtime information of the Web service, and sending the message to the Web service provider through the message intercepting module, and a management information acquiring module for acquiring the detailed runtime information based on an acknowledgment tracing header in the response message coming from the Web service provider, and transferring the acquired detailed runtime information of the Web service to a management server.

According to yet another aspect of the present invention, a message interceptor on the Web service provider side comprises a message intercepting module for intercepting the messages sent to the Web service provider side, a message analysis module for analyzing the messages intercepted by the message intercepting module to identify service request messages issued by the Web service requester, which contain tracing headers for requesting the detailed runtime information of the Web service, and response messages returned by the Web service, a detailed runtime information tracing module for tracing the detailed runtime information during the execution of the Web service in respect of a service request message when the message analysis module has identified the service request message containing a tracing header, and an acknowledgment tracing header adding module for adding an acknowledgment tracing header containing the traced detailed runtime information into the response message when the message analysis module has identified the response message returned by the Web service, and sending the message to the Web service requester through the message intercepting module.

According to a further aspect of the present invention, a computer program product for Web service information management in a service-oriented architecture application comprises a computer usable medium having computer usable program code embodied therewith. The computer usable program code comprises computer usable program code configured to intercept a service request message issued by a Web service requester for a Web service in response to executing the service-oriented architecture application on the Web service requester side, computer usable program code configured to add a tracing header in the service request message for requesting the detailed runtime information of the Web service and sending the message to the Web service provider side, computer usable program code configured to intercept the service request message coming from the Web service requester on the Web service provider side, computer usable program code configured to trace detailed runtime information based on the tracing header for requesting the detailed runtime information in the message during the execution of the Web service with respect of the service request message, and computer usable program code configured to add an acknowledgement tracing header containing the traced detailed runtime information into the response message to be returned to the Web service requester by the Web service provider and returning the message to the Web service requester.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenaria, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
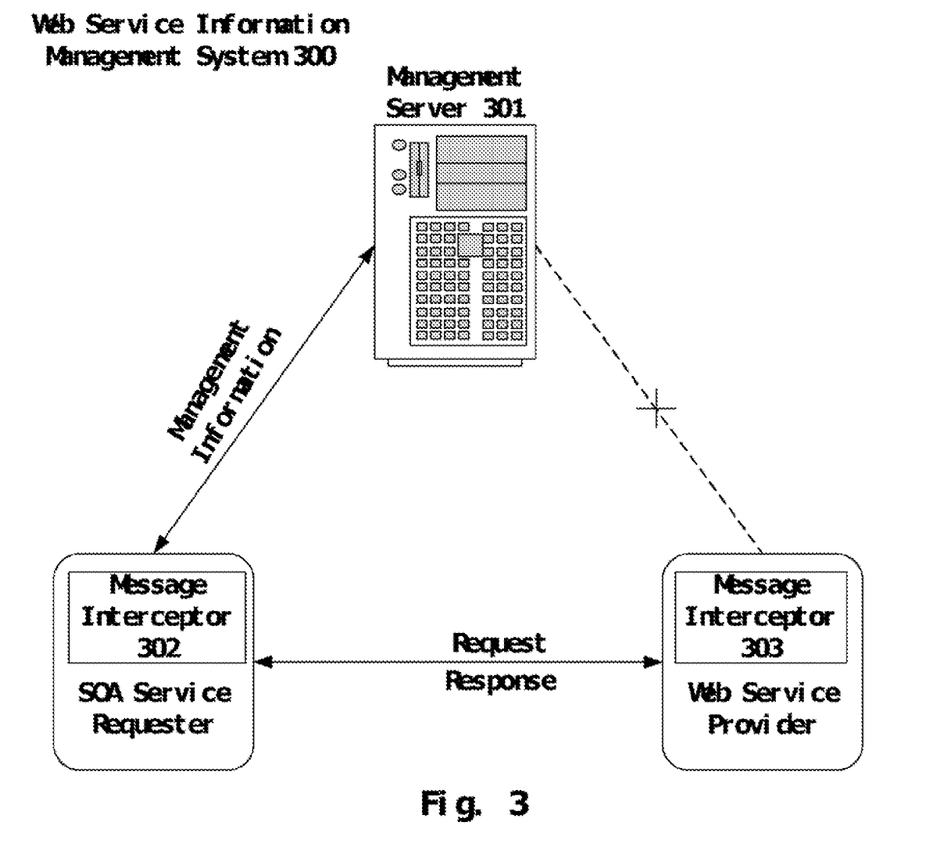
FIG. 3 schematically shows a Web service information management system for service-oriented architecture applications according to a preferred embodiment of the present invention.

FIG. 3 shows the structure of a Web service information management system for SOA applications according to an embodiment of the present invention. As shown in FIG. 3, the Web service information management system 300 comprises a management server 301, a message interceptor 302 on the SOA service requester side and a message interceptor 303 on the Web service provider side.

In this system, the management server 301 odes not communicate directly with the managed resources, namely, the Web services, and acquires the Web service management information from the message interceptor 302 on the SOA service requester side that invokes the Web service when executing the SOA application, and performs, maintenance operations such as storing or updating on the acquired Web management information.

The message interceptor 302 on the SOA service requester side is used for intercepting messages communicated between the SOA service requester and the invoked Web service provider during a SOA application is executed. The message interceptor 302 requests the detailed runtime information of the invoked Web service through modifying the service request message issued by the SOA service requester and acquires the requested detailed runtime information from the response message returned by the Web service. In the case of multi-level invocations of Web services contained in the SOA application service process, the message interceptor 302 on the SOA service requester side may also be looked upon as an interceptor at the root service requester.

Figure 4:
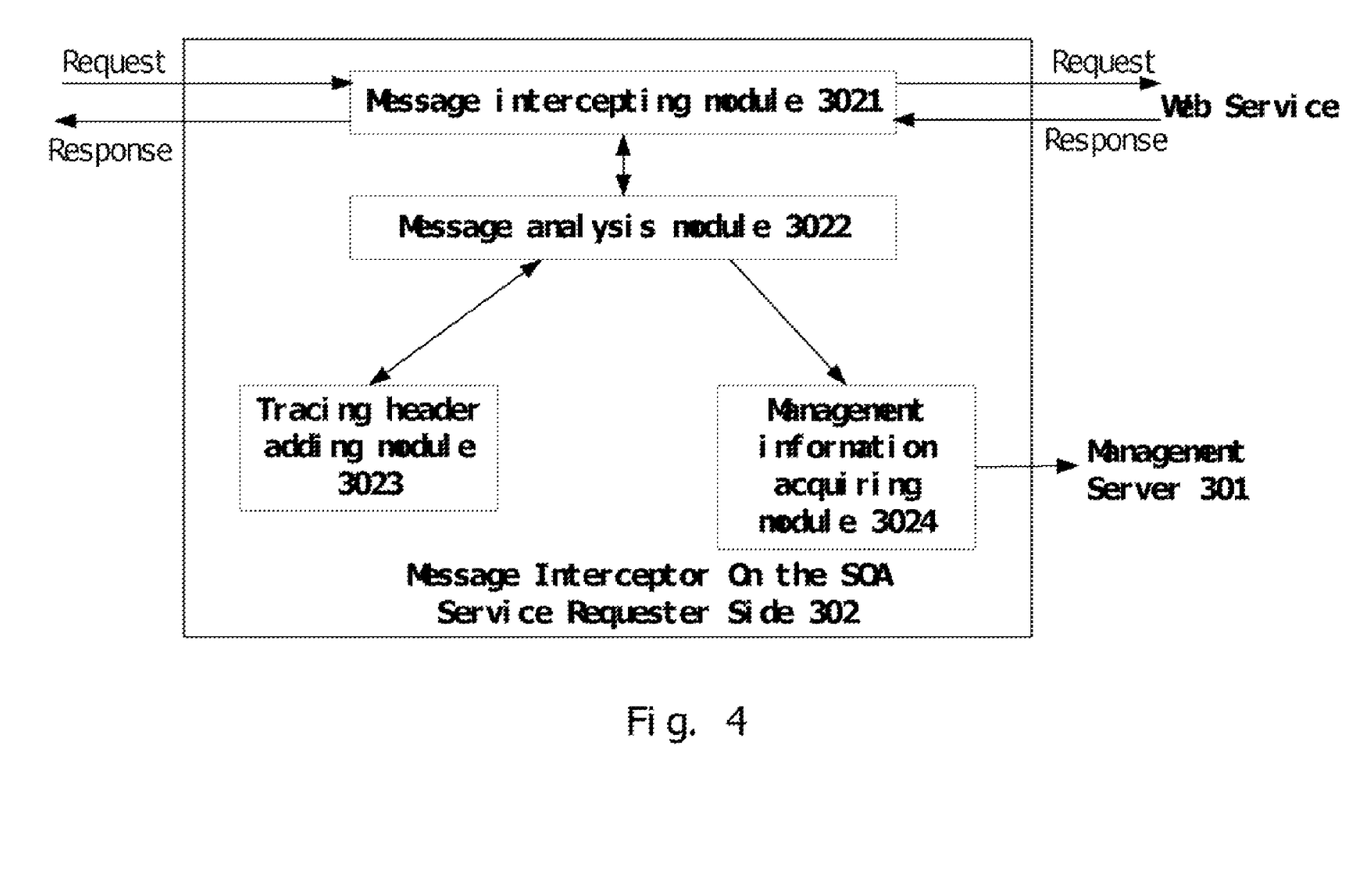
FIG. 4 is a block diagram of a message interceptor on the service requester side of a service-oriented architecture application according to a preferred embodiment of the present invention.

FIG. 4 is a lock diagram of a message interceptor 302 on the SOA service requester side according to an embodiment of the present invention. As shown in FIG. 4, the message interceptor 302 comprises a message intercepting module 3021, a message analysis module 3022, a tracing header adding module 3023 and a management information acquiring module 3024.

The message intercepting module 3021 intercepts messages communicated between the SOA service requester executing a SOA application and the provider of the Web service invoked by the SOA service requester based on the message intercepting rules set in the message interceptor 302 and the security and management rules on the SOA service requester side, and sends the intercepted messages that have been processed by the message interceptor 302 to the original destinations of the messages. Here, the messages communicated between the SOA service requester and the Web service provider may include service request messages, response messages and messages that contain the parameters, information, data, notifications and the like needed during the interaction between the SOA service requester and the Web service.

The message analysis module 3022 analyzes the messages intercepted by said message intercepting module 3021 to identify service request messages and transfers the messages to the tracing header adding module 3023 for processing. Besides, the message analysis module analyzes the response messages returned from the invoked Web service, judges whether they contain any acknowledgment tracing header in the form of a SOAP header, and transfers the response messages that contain an acknowledgment tracing header to the management information acquiring module 3024.

The tracing header adding module 3023 adds a tracing header in the service request message issued by the SOA service requester and transferred from the message analysis module 3022, for requesting the detailed runtime information of the Web service. In the present embodiment, the tracing header takes the form of the following SOAP header:

---

<trace contextID=="... "operationID= "...">
...
</trace>

--- wherein, the contextID and operationID are used to identify a pair of context identifier and operation identifier of one Web service invocation. For instance, <trace contextID="XYZ" operationID="R111"> identifies a Web service invocation with the context "XYZ" and the operation "R111". Any interaction or operation executed during this Web service invocation is identified with this pair of identifiers, so as to trace the situation of the Web service execution during this Web service invocation with this pair of identifiers.

Of these two identifiers, the operation identifier is a globally unique identifier newly produced by the tracing header adding module 3023 according to the operation corresponding to the service request message. While for the context identifier, if at this point there is a context identifier in the context (for instance, in the thread local variables), this context identifier will be adopted directly, otherwise, in the case that there is no existing context identifier, the tracing header adding module 3023 will newly produce a globally unique identifier, and save it in the context as the context identifier.

Besides, the tracing header adding module 3023 may further add a security credential into the tracing header, so that the invoked Web service may authenticate the SOA service requester based on the credential.

The management information acquiring module 3024 receives the response message containing an acknowledgement tracing header identified by the message analysis module 3022, and acquires the detailed runtime information of the corresponding Web service based on the acknowledgment tracing header in the response message. It should be noted that the detailed runtime information includes the invocation topology during the execution of the Web service in respect of the service message issued by the SOA service requester and the Web service's management information or the path for retrieving the Web service's management information. Beside, in order to identify which service invocation the runtime information corresponds to, the acknowledgment tracing header also contains the context identifier and operation identifier in the service request message corresponding to this invocation, so that the SOA service requester can correctly collect the information of the Web service. Then, the management information acquiring module 3024 transfers the acquired detailed runtime information of the Web service to the management server 301, so that the management server 301 can update and maintain the management data of the Web service for the problem diagnosis and performance analysis of the SOA application executed by the SOA service requester.

Besides, in the message interceptor 302, pro-condition and post-condition checking logics may be defined, so as to trigger special management events based on the message content and service context.

Now return to FIG. 3, the message interceptor 303 on the Web service provider side is used to intercept messages communicated between the Web service and the Web service requester, and in the case of having identified that the Web service requester has requested the detailed runtime information of the Web service through the tracing header in the service request message, to trace the detailed runtime information during the execution of the Web service and return the detailed runtime information to the SOA service requester through the response message.

It should be noted that in the case that the Web service during its execution, as a service requester, further requests another Web service, the message interceptor 303 will function as a message interceptor on the service requester side, that is, to intercept the service request message issued by the Web service to the other Web service, and to add tracing headers in it for requesting the detailed runtime information of the other Web service. Whereas the other Web service, after completing the execution, returns the detailed runtime information to the Web service through a response message. In this way, by using the context identifiers and operation identifiers, the tracing of the whole service invocation process may be realized. Thus, in the case that the SOA application service process executed on the Web service requester side contains multi-level Web service invocations, the message interceptor 303 on the web service provider side may be looked upon as a message interceptor at a intermediate service node or leaf service node.

Figure 5:
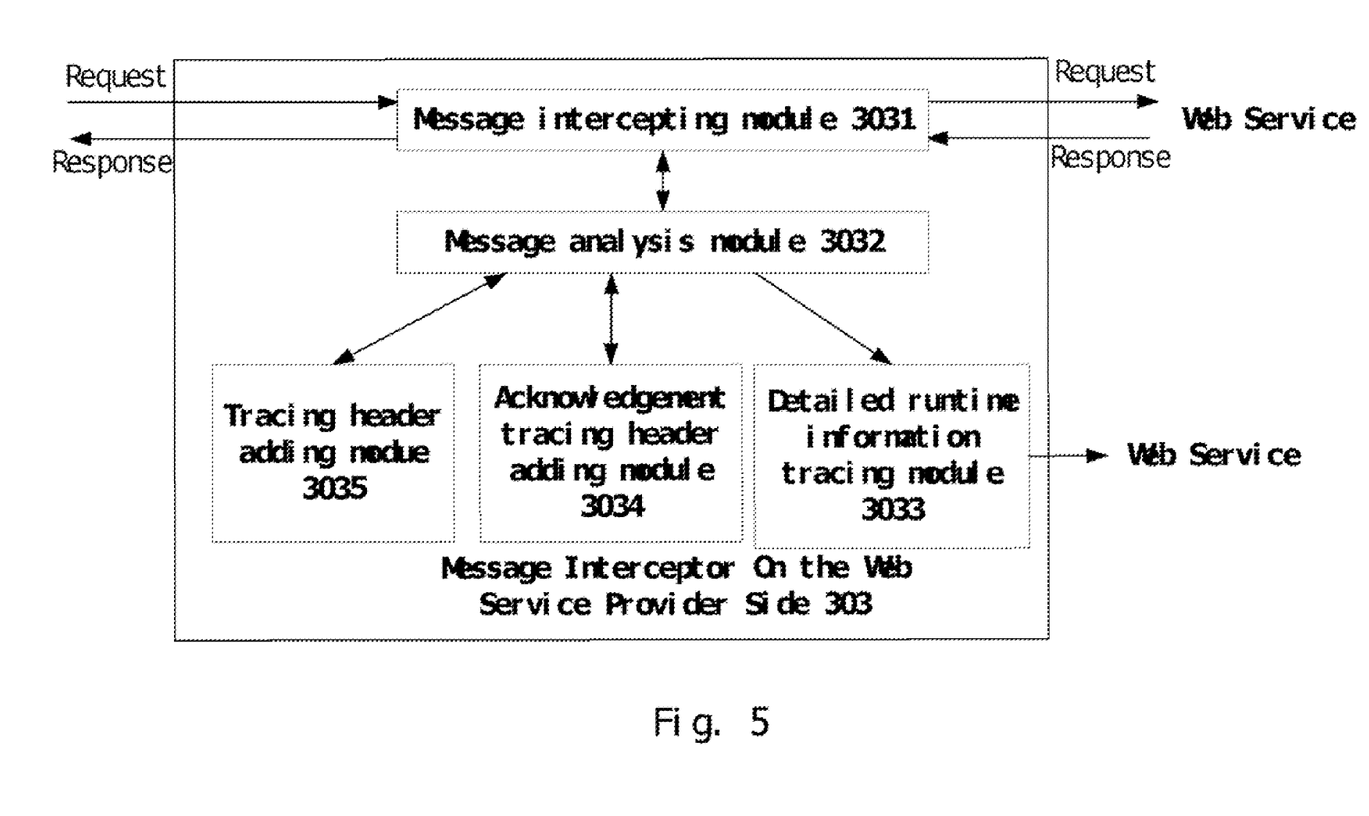
FIG. 5 is a block diagram of a message interceptor on the Web service provider side according to a preferred embodiment of the present invention.

FIG. 5 is a block diagram of a message interceptor on the Web service provider side according to a preferred embodiment of the present invention. As shown in FIG. 5, the message interceptor 303 comprises a message intercepting module 3031, a message analysis module 3032, a detailed runtime information tracing module 3033, an acknowledgement tracing header adding module 3034 and a tracing header adding module 3035.

The message intercepting module 3031 intercepts the messages communicated between the Web service requester and the provider of the Web service based on the message intercepting rules set in the message interceptor 303 and sends the intercepted messages, which have than been processed by the message interceptor 303, to the original destination of the message.

The message analysis module 3032 analyzes the messages sent by the Web service requester and intercepted by said message intercepting module 3031 to identify the service request messages containing the tracing header for requesting the detailed runtime information of the Web service. In the case of such a service request message having been identified, the message analysis module 3032 extracts the tracing header, taking the operation identifier in the header as its context identifier for use during the execution of the Web service in respect of the service request message. Furthermore, in such a case, the message analysis module 3032 also instructs the detailed runtime information tracing module 3033 to trace the detailed runtime information during the execution of the Web service.

Besides, the message analysis module 3032 also analyzes the response message returned by the Web service to the Web service requester, judges whether the service request message corresponding to the response message contains any tracing header for requesting the detailed runtime information, and in the case of a tracing header existing, transfers the response message to the acknowledgement tracing header adding module 3034 and instructs it to add an acknowledgement tracing header.

Besides, the message analysis module 3032 further identifies any service request message sent to another Web service by the Web service during its execution process among the messages intercepted by the message intercepting module 3031. In the case of such a message having been identified, the message analysis module 3032 instructs the tracing header adding module 3035 to add a tracing header in the service requesting message.

Besides, the message analysis module 3032 further identifies any response message returned by another Web service invoked by the Web service among the messages intercepted by the message intercepting module 3031. In the case of such a message having been identified, the message analysis module 3032 instructs the detailed runtime information tracing module 3033 to acquire the detailed runtime information.

During the execution of the Web service in respect of the received service request message and under the instruction of the message analysis module 3032, the detailed runtime information tracing module 3033 records the detailed runtime information of the Web service, including the invocation topology during the execution of the Web service and the management information during the execution of the Web service. Besides, in the case that the message analysis module has identified a response message returned by another Web service invoked by the Web service, the detailed runtime information tracing module 3033 further acquires the detailed runtime information of the other Web service based on the acknowledgement tracing header in the response message to realize the recording of the detailed runtime information of the next level Web services.

The acknowledgement tracing header adding module 3034, under the instruction of the massage analysis module 3032, acquires the recorder detailed runtime information of the Web service from the detailed runtime information tracing module 3033, and adds the runtime information in the form of an acknowledgement tracing header into the response message transferred from the message analysis module 3032 and to be sent to the Web service requester. Here the acknowledgement tracing header takes the form of the following SOAP header:

```
<trace contextID="..." operationID="...">
<info type="..." method="..." >
</trace>
message body
<management>
information
</management>
```

The acknowledgement tracing header is similar to the tracing header in the above-mentioned service request message, and includes the context identifier and operation identifier identifying this service invocation. The context identifier and operation identifier are the same as the context identifier and operation identifier, respectively, in the service request message initially invoking the Web service. The "info type" and "method" indicate the type of the information returned in the response message and the method for acquiring the detailed runtime information of the Web service, respectively. In the present embodiment, the following two ways may be used for returning the detailed information:

1) In-band: adding the detailed runtime information of the Web service into the response message directly (for instance, packaging it into the massage attachment). Thus, the passage of the detailed runtime information across domains can be realized. But the information amount carried in the response message with this method is relatively small.

2) Out-band: only the method, such as the path, addresse etc., for acquiring the detailed runtime information of the Web service is carried in the response message. With the method, the service requester need a separate operation to acquire the required information, but a large amount of detailed information can be acquired.

Now, still taking the tracing header in the service request message mentioned above as an example, the acknowledgement tracing header in the response message corresponding to the tracing header may be:

```
<trace contextID="XYZ" operationID="R111">
<info type="inband" method="MIME">
</trace>
Message Body
<management>
information
</management>
```

The acknowledgement tracing header adding module 3034, after adding the acknowledgement tracing header into the response message, returns the message to the message analysis module 3032, and sends it to the original destination of the message through the message intercepting module 3031.

The tracing header adding module 3035 serves the functions similar to those of the tracing header adding module 3022 in the message interceptor 302 on the SOA service requester side. In the case that the message analysis module 3032 has identified a service request message sent by the Web service to another Web service during the execution of the Web service, the tracing header adding module 3035, under the instruction of the message analysis module 3032, adds a tracing header into the service request message for requesting the detailed runtime information. The tracing header has a same header form as that adopted by the above-mentioned tracing header adding module 3022. Here the context identifier is the existing context identifier on the Web service provider side, while the operation identifier is the one produced by the tracing header adding module 3035 based on a specific operation corresponding to the service request message.

Thus, by using message interceptors on the SOA service requester side and the Web service provider side to add tracing headers and detailed runtime information, it can be realized to trace and collect the detailed runtime information of a Web service during the execution of the Web service process of a SOA application, so as to more effectively control the whole service process of SOA application.

It should be noted that the message interceptor 302 on the SOA service requester side and the message interceptor 303 on the Web service provider side in the present embodiment may be an extension of the Web service engine to realize a transparent service tracing and information collection mechanism.

The may be no compulsory requirement on the service provider. A service provider may voluntarily select whether to support the method or not. If the method is supported, the requester of the Web service can acquire the specific execution process of the service. During the whole execution process of the web service, If a certain service provider does not support the method, only this service and its invocated Web services will not provide information on the specific execution process, without affecting the other services to provide the detailed runtime information.

Figure 6:
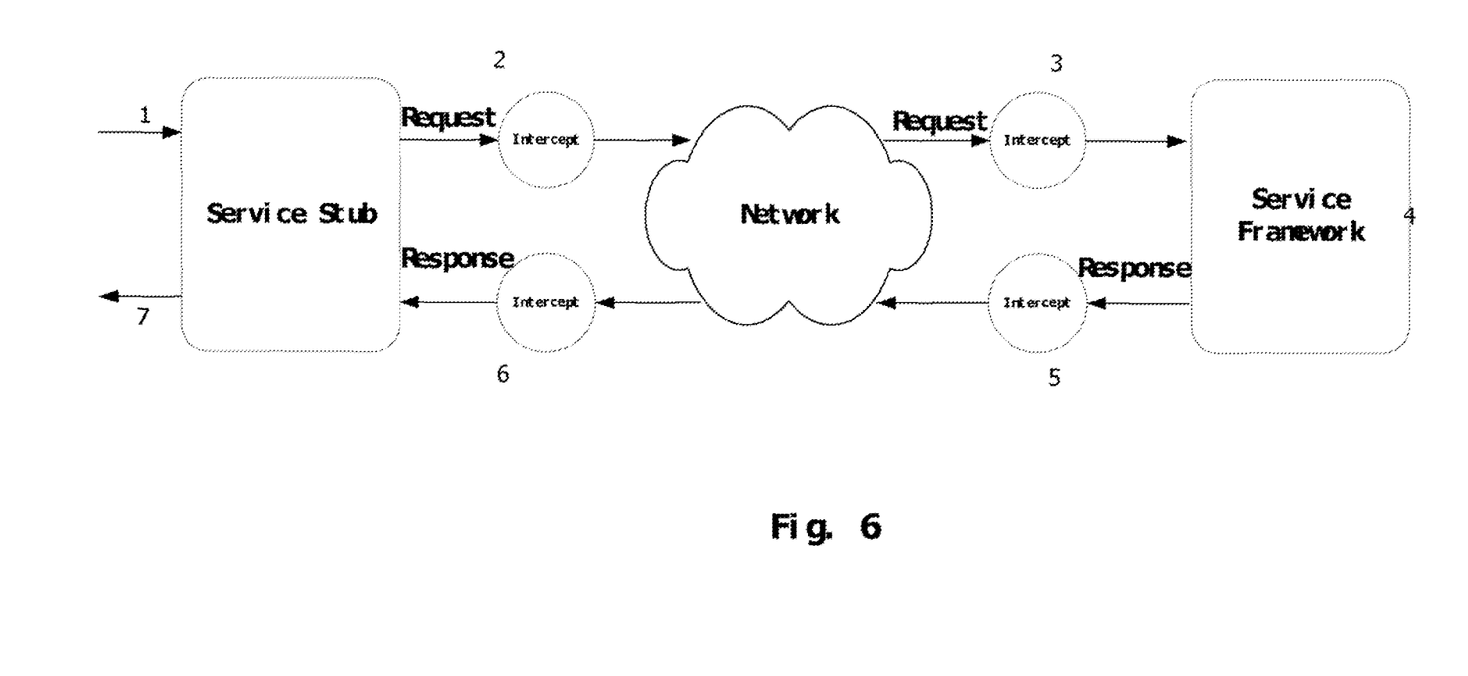
FIG. 6 is a flowchart of the Web service information management method for service-oriented architecture applications according to a preferred embodiment of the present invention.

Above a detailed description of the Web service information management system for SOA applications has been given, below a description will be given of the method for Web service information management in SOA applications implemented with the system. FIG. 6 is a flowchart of the Web service information management method for SOA applications according to an embodiment of the present invention.

As shown in FIG. 6, in Step 1 of the method, the SOA service requester that is executing a SOA application issues a service request message to a remote Web service through a Web service stub for invocation.

In Step 2, the message interceptor 302 on the SOA service requester side intercepts the service request message sent by the SOA service requester, adds a tracing header containing a context identifier and an operation identifier into the message, and sends the service request message to the Web service provider through the network.

In Step 3, the message interceptor 303 on the Web service provider side intercepts the service request message and acquires the tracing header in the message.

In Step 4, the Web service performs operation in respect of the service request message, while the message interceptor 303 traces the detailed runtime information, including the detailed runtime information of the subsequently invocated Web services, during the execution of the Web service.

In Step 5, the message interceptor 303 on the Web service provider side intercepts the response message returned to the SOA service requester after completion of the execution of the Web service, and adds an acknowledgement tracing header into the response message, including the traced detailed runtime information or its retrieval method, and then sends the message to the SOA service requester through a network.

In Step 6, the message interceptor 302 on the SOA service requester side intercepts the response message, acquires the acknowledgement tracing header in the message and acquires the detailed runtime information based on the acknowledgement tracing header, and sends the message to the management server as well for performing the corresponding updates. Then, the response message is transferred to the SOA application through the service stub on the SOA service requester side.

Figure 7:
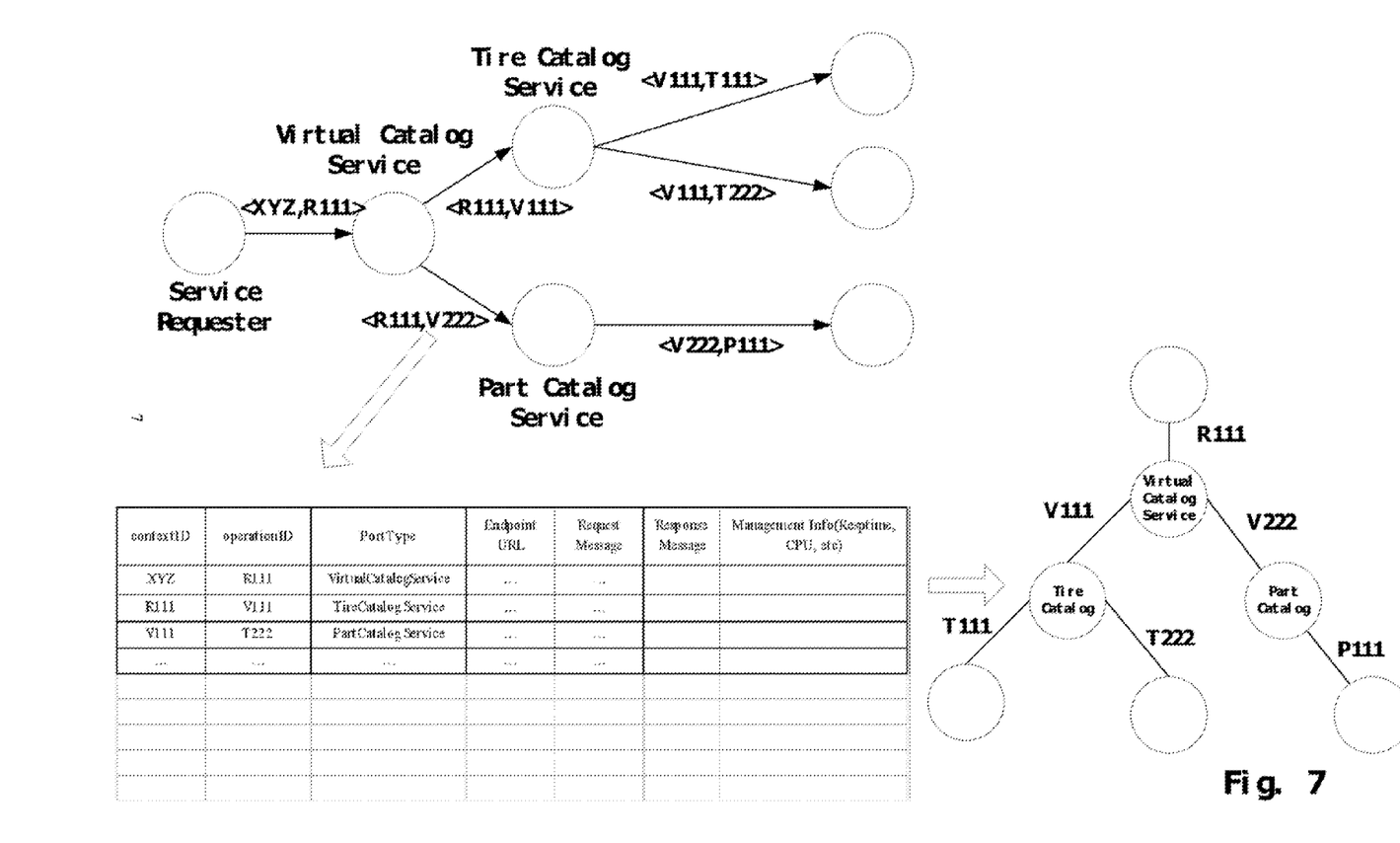
FIG. 7 shows the service process and data correlation analysis of a specific example of the service-oriented architecture application in which the present invention is applied.

Besides, after acquiring the detailed runtime information of the Web service by using the present invention, all the information may be recorded in a table. And based on this table, by using the context identifier of each service invocation as the node identifier and using the operation identifier to define the invocation relationship between the node and its child node, the runtime topology of the Web service may be created. In this way, it is possible for the developers and administrators of SOA applications to have the request message, response message and corresponding management information of each Web service invocation in hand. FIG. 7 shows the service process and data correlation analysis of the above-mentioned specific example of the SOA application where the present invention is applied.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for Web service information management in a service-oriented architecture application, comprising:
   intercepting a service request message issued to a Web service provider by a Web service requester for a Web service in response to executing said service-oriented architecture application on a Web service requester side;
   adding a tracing header in the service request message for requesting detailed runtime information of the Web service and sending the service request message to a Web service provider side;
   intercepting the service request message coming from the Web service requester on the Web service provider side;
   tracing detailed runtime information based on the tracing header during the execution of the Web service in response to the service request message; and
   adding an acknowledgement tracing header containing detailed runtime information, produced by said tracing, into a response message to be returned to the Web service requester by the Web service provider and returning the response message to the Web service requester.

2. The method as claimed in claim 1, further comprising: said Web service requester acquires the detailed runtime information from the acknowledgment tracing header of the received response message coming from said Web service provider and transfers the acquired detailed runtime information to a management server.

3. The method as claimed in claim 2, further comprising:
   setting message intercepting rules on said Web service requester side; and based on the message intercepting rules, executing the step of intercepting the service request message on the Web service requester side.

4. The method as claim in claim 1, further comprising:
   setting message intercepting rules on said Web service provider side; and
   based on the message intercepting rules and the security and management rules on the Web service provider side, executing the step of intercepting the service request message on the Web service provider side, and the step of adding an acknowledgement tracing header containing the detailed runtime information in the returned response message.

5. The method as claimed in claim 1, further comprising:
   defining pre-condition and post-condition checking logics on the Web service requester side, so as to trigger specific management events based on the message content and service context.

6. The method as claimed in claim 1, wherein the detailed runtime information tracing header in said service request message comprises a context identifier and an operation identifier for identifying this service invocation.

7. The method as claimed in claim 6, wherein the detailed runtime information tracing header in said service request message further comprises a security credential used in the authentication of said Web service requester by said Web service provider.

8. The method as claimed in claim 6, wherein said operation identifier is a globally unique identifier produced according to the operation related to said service request message, while said context identifier is an existing context identifier in case that there is the context on said Web service requester side, and a newly produced globally unique identifier in the case that there is no existing context identifier on the Web service requester side.

9. The method as claimed in claim 8, further comprising:
   when receiving a service request message containing a detailed runtime information tracing header, said Web service provider takes the operation identifier in the tracing header as its context identifier; and
   during the execution, the Web service invokes another Web service with the contest identifier and a produced corresponding operation identifier, and requests the detailed runtime information of the other Web service in the service request message in the form of a detailed runtime information tracing header, so as to realize the recursive collection of the Web service information.

10. The method as claimed in claim 6, wherein the detailed runtime information in the acknowledgement tracing header of said response message comprises the context identifier and the operation identifier corresponding to the Web service request message.

11. The method as claim in claim 10, wherein said detailed runtime information in the acknowledgment tracing header of said response message further comprises at least one of following: the invocation topology of said Web service, the management information of said Web service and the method for retrieving the management information of said Web service.

12. The method as claimed in claim 1, wherein the tracing header in said service request message and the acknowledgement tracing header in said response message take the form of a SOAP header.

13. A message interceptor stored on a computer usable memory for implementation on a Web service requester side, comprising:
    a message intercepting module for intercepting messages communicated between a Web service requester and a Web service provider when a service-oriented architecture application is executed;
    a message analysis module, executed by processor, for analyzing messages intercepted by said message intercepting module to identify service request messages issued by the Web service requester and response messages containing tracing headers provided by the Web service provider;
    a tracing header adding module, executed by processor, for adding a tracing header in a service request message sent by the Web service requester for requesting detailed runtime information of a corresponding Web service, and sending the message to the Web service provider; and
    a management information acquiring module, executed by processor, for acquiring the detailed runtime information based on an acknowledgment tracing header in a corresponding response message coming from the Web service provider, and transferring that detailed runtime information for the Web service to a management server.

14. A message interceptor stored on a computer usable memory for implementation on a Web service provider side, comprising:
    a message intercepting module, executed by processor, for intercepting messages sent to the Web service provider side;
    a message analysis module, executed by processor, for analyzing the messages intercepted by said message intercepting module to identify service request messages issued by a Web service requester that contain tracing headers requesting detailed runtime information for a Web service, and response messages returned by the Web service;
    a detailed runtime information tracing module, executed by processor, for tracing the detailed runtime information during execution of the Web service in response to a service request message when said message analysis module has identified the service request message as containing a tracing header; and
    an acknowledgment tracing header adding module, executed by processor, for adding an acknowledgment tracing header containing the detailed runtime information produced by the detailed runtime information tracing module into the response message when said message analysis module has identified the response massage returned by the Web service, and sending the response message to the Web service requester.

15. The message interceptor as claimed in claim 14, wherein the detailed runtime information tracing header in said service request message comprises a context identifier and an operation identifier for identifying this service invocation.

16. The message interceptor as claimed in claim 15, wherein the detailed runtime information tracing header in said service request message further comprises a security credential used in the authentication of said Web service requester by said Web service provider.

17. The message interceptor as claimed in claim 15, wherein said message analysis module takes the operation identifier contained in the tracing header of said service request message as the context identifier on the Web service provider side, and said message analysis module further identifies, among the messages intercepted by said message interceptor module, the service request messages sent to other Web services by the Web service during the execution and the response messages returned by the other Web services.

18. The message interceptor as claimed in claim 17, further comprising:
    a tracing header adding module, executed by processor, for adding a tracing header containing said context identifier and a newly produced corresponding operation identifier into the service request messages sent to other Web services and identified by said message analysis module, and sending the service request messages to the other Web services through said message interceptor module.

19. The message interceptor as claimed in claim 17, wherein said detailed runtime information tracing module acquires and records the detailed runtime information of the other Web services from the response messages returned by the other Web services and identified by said message analysis module.

20. A computer program product for Web service information management in a service-oriented architecture application, the computer program product comprising:
    a computer usable memory having computer usable program code embodied therewith, the computer usable program code comprising:
    a computer usable program code, for execution by a processor, to intercept a service request message issued by a Web service requester for a Web service in response to executing said service-oriented architecture application on a Web service requester side;
    computer usable program code, for execution by a processor, to add a tracing header in the service request message for requesting detailed runtime information of the Web service and sending the message to a Web service provider side;
    computer usable program code, for execution by a processor, to intercept the service request message coming from the Web service requester on the Web service provider side;
    computer usable program code, for execution by a processor, to trace detailed runtime information based on the tracing header during execution of the Web service in response to the service request message; and
    computer usable program code, for execution by a processor, to add an acknowledgement tracing header containing detailed runtime information into a response message to be returned to the Web service requester.

* * * * *